US008118387B2

(12) United States Patent
Silverbrook

(10) Patent No.: US 8,118,387 B2
(45) Date of Patent: *Feb. 21, 2012

(54) PRINTER INCLUDING DOT DATA GENERATOR WITH STOCHASTICALLY RAMPED PRINT DATA

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,925

(22) Filed: May 19, 2011

(65) Prior Publication Data

US 2011/0216116 A1 Sep. 8, 2011

Related U.S. Application Data

(63) Continuation of application No. 12/712,041, filed on Feb. 24, 2010, now Pat. No. 7,954,919, which is a continuation of application No. 10/986,785, filed on Nov. 15, 2004, now Pat. No. 7,677,687, which is a continuation of application No. 10/636,258, filed on Aug. 8, 2003, now Pat. No. 7,766,453, which is a continuation of application No. 10/129,435, filed as application No. PCT/AU01/00216 on Mar. 2, 2001, now Pat. No. 6,623,106.

(30) Foreign Application Priority Data

Mar. 2, 2000 (AU) ...................................... PQ5959

(51) Int. Cl.
*B41J 29/38* (2006.01)
*B41J 2/155* (2006.01)
*G01J 3/46* (2006.01)

(52) U.S. Cl. ............................................ 347/13; 347/42

(58) Field of Classification Search .................... 347/13, 347/42

See application file for complete search history.

(56) References Cited

U.S. PATENT DOCUMENTS

| | | | |
|---|---|---|---|
| 4,714,934 | A | 12/1987 | Rogers |
| 5,160,945 | A | 11/1992 | Drake |
| 5,384,587 | A | 1/1995 | Takagi et al. |
| 5,450,099 | A | 9/1995 | Stephenson et al. |
| 5,486,686 | A | 1/1996 | Zdybel et al. |
| 5,565,900 | A | 10/1996 | Cowger et al. |
| 5,767,874 | A | 6/1998 | Wen et al. |
| 5,859,967 | A | 1/1999 | Kaufeld et al. |
| 6,068,367 | A | 5/2000 | Fabbri |
| 6,290,334 | B1 | 9/2001 | Ishinaga et al. |
| 6,312,099 | B1 | 11/2001 | Hawkins et al. |
| 6,330,976 | B1 | 12/2001 | Dymetman et al. |
| 6,352,329 | B1 | 3/2002 | Watanabe et al. |
| 6,386,668 | B1 | 5/2002 | Shimizu et al. |
| 6,450,614 | B1 | 9/2002 | Scheffelin et al. |
| 6,457,800 | B1 | 10/2002 | Bohm et al. |

(Continued)

FOREIGN PATENT DOCUMENTS

EP 0034060 A1 8/1981

(Continued)

*Primary Examiner* — Julian Huffman

(57) ABSTRACT

A printer including a plurality of printhead modules located across a print media transport path is disclosed. Each printhead module has an elongate printhead. Nozzles of respective printheads overlap with nozzles of printheads of neighboring printhead modules. The printer further includes a dot data generator for providing print data to nozzles such that print data is stochastically ramped from one neighboring printhead module to a next neighboring printhead module.

6 Claims, 12 Drawing Sheets

U.S. PATENT DOCUMENTS

| | | | | |
|---|---|---|---|---|
| 6,976,220 | B1 | 12/2005 | Lapstun et al. | |
| 7,677,687 | B2 * | 3/2010 | Silverbrook | 347/13 |
| 7,954,919 | B2 * | 6/2011 | Silverbrook | 347/13 |

FOREIGN PATENT DOCUMENTS

| | | | |
|---|---|---|---|
| EP | 0440469 | A2 | 8/1991 |
| EP | 0512799 | | 11/1992 |
| EP | 0813968 | A | 12/1997 |
| EP | 0914950 | A2 | 5/1999 |
| JP | 53-066697 | | 6/1978 |
| JP | 56-137459 | | 3/1981 |
| JP | 58-038170 | | 3/1983 |
| JP | 59-103761 | | 6/1984 |
| JP | 05-162299 | | 6/1993 |
| JP | 06-344627 | A | 12/1994 |
| JP | 07-081049 | | 3/1995 |
| JP | 11-198380 | | 7/1999 |
| WO | WO 00/07820 | | 2/2000 |
| WO | WO 00/64680 | A | 11/2000 |

* cited by examiner

PRINTER INCLUDING DOT DATA GENERATOR WITH STOCHASTICALLY RAMPED PRINT DATA

CROSS REFERENCE TO RELATED APPLICATIONS

This Application is a Continuation Application of U.S. Ser. No. 12/712,041 filed on Feb. 24, 2010, which is a Continuation Application of U.S. Ser. No. 10/986,785 filed on Nov. 15, 2004, now issued U.S. Pat. No. 7,677,687, which is a Continuation Application of U.S. Ser. No. 10/636,258 filed on Aug. 8, 2003, now issued U.S. Pat. No. 7,766,453, which is a Continuation Application of U.S. Ser. No. 10/129,435, filed on May 6, 2002, now Issued U.S. Pat. No. 6,623,106, which is a national phase application (371) of PCT/AU01/00216, filed on Mar. 2, 2001, all of which are herein incorporated by reference.

FIELD OF THE INVENTION

The invention relates broadly to digital inkjet printers and in particular to digital ink jet printers configured to print the entire width of a page simultaneously.

BACKGROUND OF THE INVENTION

Traditionally, inkjet printers have used a printing head that traverses back and forth across the width of a page as it prints. Recently, it has been possible to form printheads that extend the entire width of the page so that the printhead can remain stationary as the page is moved past it. As pagewidth printheads do not move back and forth across the page, much higher printing speeds are possible.

Pagewidth printheads are typically micro electro mechanical systems (MEMS) devices that are manufactured in a manner similar to silicon computer chips. In this process, the ink nozzles and ejector mechanisms are formed in a series of etching and deposition procedures on silicon wafers.

As an industry standard, the silicon wafers are produced in 6 or 8 inch diameter disks. Consequently only a small strip across the diameter of each wafer can be used to produce printing chips of sufficient width for pagewidth printing. As a large part of these wafers are essentially wasted, the production costs of pagewidth printhead chips are relatively high.

The costs are further increased because the chip defect rate is also relatively high. Faults will inevitably occur during silicon chip manufacture and some level of attrition is always present. A single fault will render an entire pagewidth chip defective, as is the case with any silicon chip production. However, because the pagewidth chip is larger than regular chips, there is a higher probability that any particular pagewidth chip will be defective thereby raising the defect rate as a whole in comparison to regular silicon chip production.

To address this, the pagewidth printhead may be formed from a series of separate printhead modules. Using a number of adjacent printhead modules permits full pagewidth printing while allowing a much higher utilization of the silicon wafer. This lowers the printhead chip defect rate because a fault will cause a relatively smaller printhead chip to be rejected rather than a full pagewidth chip. This in turn translates to lower production costs.

Each printhead chip carries an array of nozzles which have mechanical structures with sub-micron thickness. The nozzle assemblies use thermal bend actuators that can rapidly eject ink droplets sized in the Pico liter ($\times 10^{-12}$ liter) range.

The microscopic scale of these structures causes problems when butting a series of printhead modules end to end in order to form a pagewidth printhead. Microscopic irregularities on the end surfaces of each chip prevent them from perfectly abutting the end surface on an adjacent chip. This causes the spacing between the end nozzles of two adjacent printhead chips to be different from adjacent nozzles on a single printhead chip. The gaps between adjacent printhead chips can lower the resultant print quality.

To eliminate the gaps, some modular pagewidth printheads use two adjacent lines of regularly spaced printhead modules. The lines are out of register with each other and the ends of a printhead module in one line overlaps with the ends of two adjacent modules in the other line. This removes the gaps from the resultant printing but also provides redundant nozzles in the areas of overlap. The print data to the overlapping nozzles is allocated between the adjacent chips so that these areas are not printed twice which would otherwise have adverse affects on the print quality.

A digital controller is connected to each of the printhead module chips via a TAB (tape automated bond) film. The TAB film is substantially the same width as the chip and this causes difficulties when mounting the chips to a support structure within the printer. It is preferable that the TAB films for each chip extend from the same side as this permits a more compact and elegant printhead design. However, this arrangement requires the TAB films from each of the chips in one of the lines to narrow or 'neck' in order to fit past the restriction caused by the overlapping ends of the adjacent chips in the other line. Producing and installing TAB films that narrow down enough is complex and difficult. To avoid this, the TAB films can extend from one side of the chips in one line and from the opposite side of the chips in the other line. However, as discussed above this gives the overall printhead greater bulk that can complicate the paper path through the printer as well as hamper capping the printheads when the printer is not in use.

SUMMARY OF THE INVENTION

According to an aspect of the present invention there is provided a printer including:

a plurality of printhead modules located across a print media transport path, each printhead module having an elongate printhead, nozzles of respective printheads overlap with nozzles of printheads of neighboring printhead modules; and a dot data generator for providing print data to the nozzles such that print data is stochastically ramped from one neighbouring printhead module to a next neighbouring printhead module in an overlap region.

Other aspects are also disclosed.

BRIEF DESCRIPTION OF THE DRAWINGS

A preferred embodiment of the present invention will now be described by way of example only with reference to the accompanying drawings in which.

DETAILED DESCRIPTION OF THE PREFERRED EMBODIMENT

Figure 1:
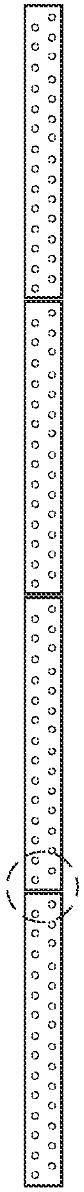
FIG. 1 schematically shows a series of printhead modules abutting end to end to form a pagewidth printhead.
Figure 2:
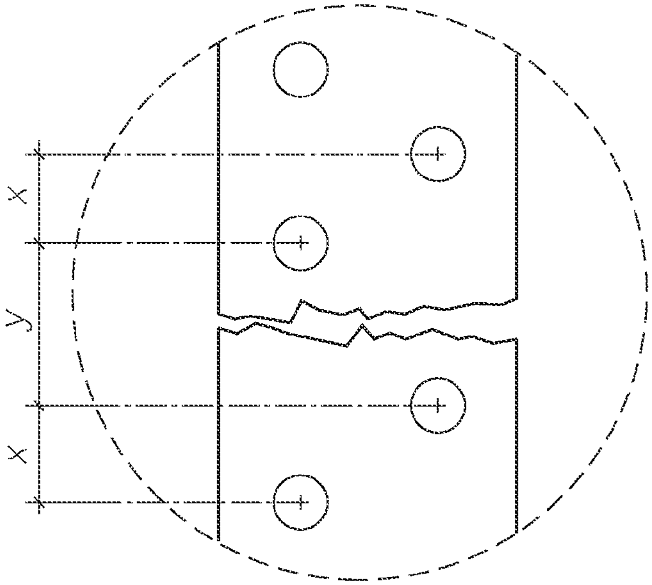
FIG. 2 shows an enlarged view of the junction between two adjacent printhead modules shown in FIG. 1.

Referring to FIGS. 1 to 4, prior art arrangements for modular pagewidth printheads are shown. In FIG. 1, the printhead chips (3) of each module (not shown) are simply abutted end to end across the printhead support beam (not shown). As shown in the enlarged view of FIG. 2, the ink nozzles are laterally spaced at a distance x along the chip. However, the microscopic irregularities in the ends of the chips (3) are enough to alter the normal spacing between the nozzles such that the end nozzles on adjacent chips are laterally spaced by a greater distance y. This adversely affects the print quality and can result in a blank line or void in the resultant printing.

Figure 3:
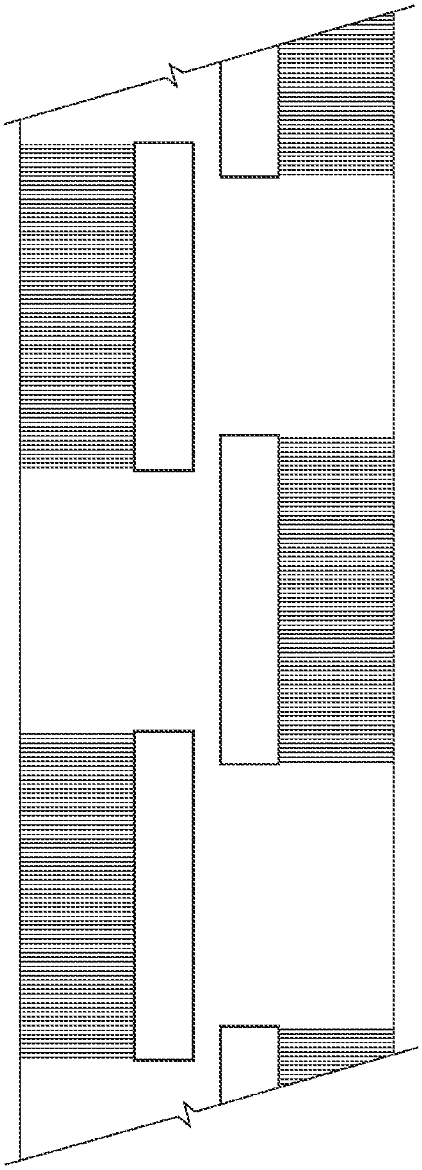
FIG. 3 Prior Art
FIG. 3 schematically shows the printhead modules configured in an overlapping relationship with TAB films extending from both sides of the printhead chips.
Figure 4:
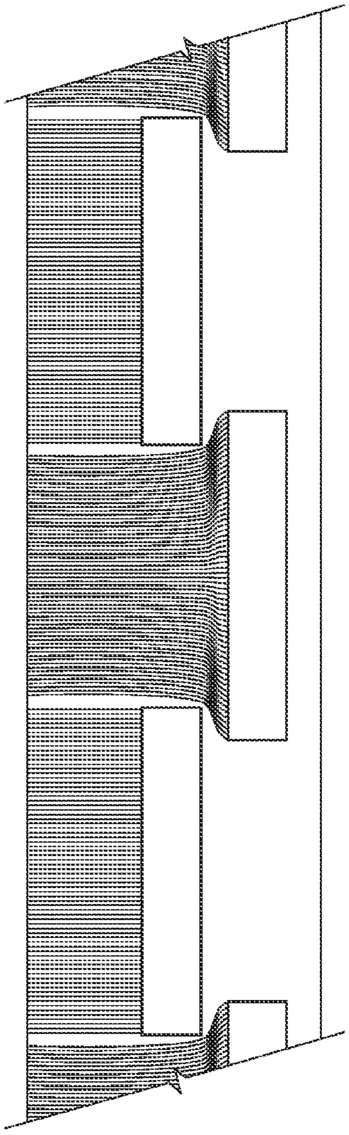
FIG. 4 Prior Art
FIG. 4 schematically shows the printhead modules configured in an overlapping relationship with TAB films extending from only one side of the printhead chips such that every second TAB film is narrowed.

FIG. 3 shows the printhead chips (3) arranged in an overlapping configuration to avoid any gaps between the printing from adjacent modules. The digital controller (not shown) shares the print data amongst the overlapping nozzles of the adjacent printhead chips so that print data is not printed twice. The TAB films (6) from each chip (3) extend from opposing sides of each adjacent chip, in order to avoid having to narrow the TAB film (6) to every second chip (3) as shown in FIG. 4. However, with the TAB films (6) extending from both sides of the chip array, the printhead becomes much wider which complicates the printer design, and in particular the paper path.

Referring to FIGS. 5A to 5D, various suitable configurations of the chip array are shown. To be suitable, the array must allow the TAB film to extend from the same side of each chip with little or no narrowing required while maintaining the chips in an overlapping relationship with respect to the paper direction. This is achieved by ensuring that the TAB film side of each chip is only obscured at one end, if at all. For illustrative purposes, the obscured areas of the chips are shaded.

Figure 5A:
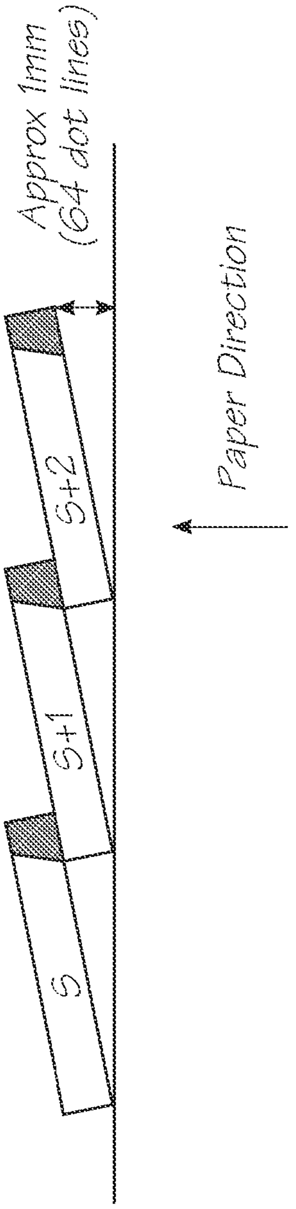
FIG. 5A schematically shows the printhead modules configured in an overlapping relationship in accordance with the present invention.
Figure 5B:
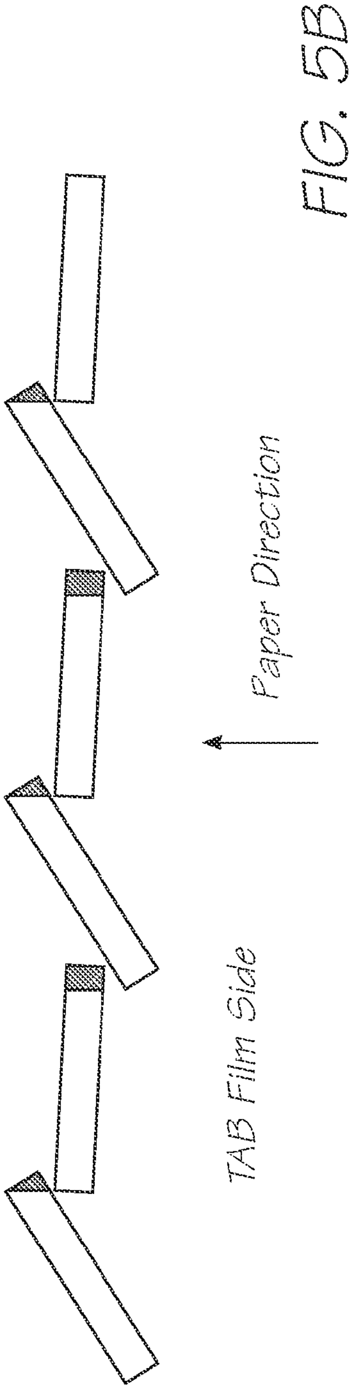
FIG. 5B schematically shows an alternative configuration of the printhead modules in an overlapping relationship in accordance with the present invention.
Figure 5C:
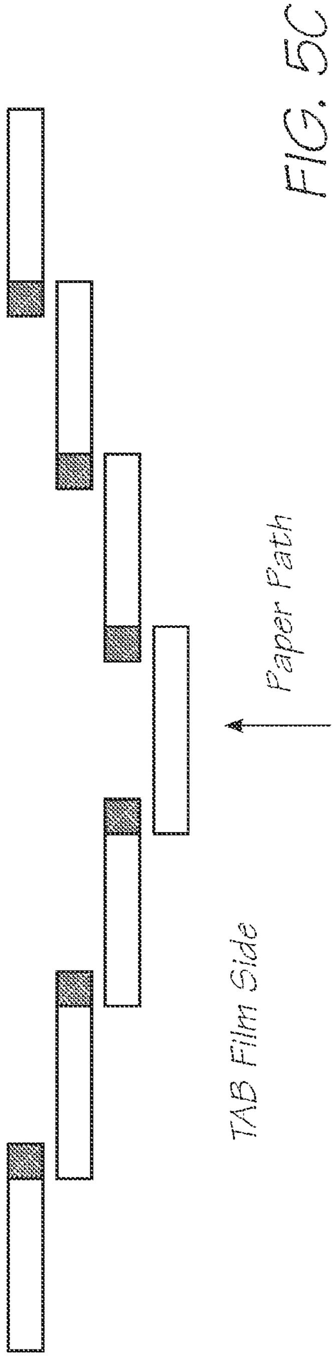
FIG. 5C schematically shows another alternative configuration of the printhead modules in an overlapping relationship in accordance with the present invention.
Figure 5D:
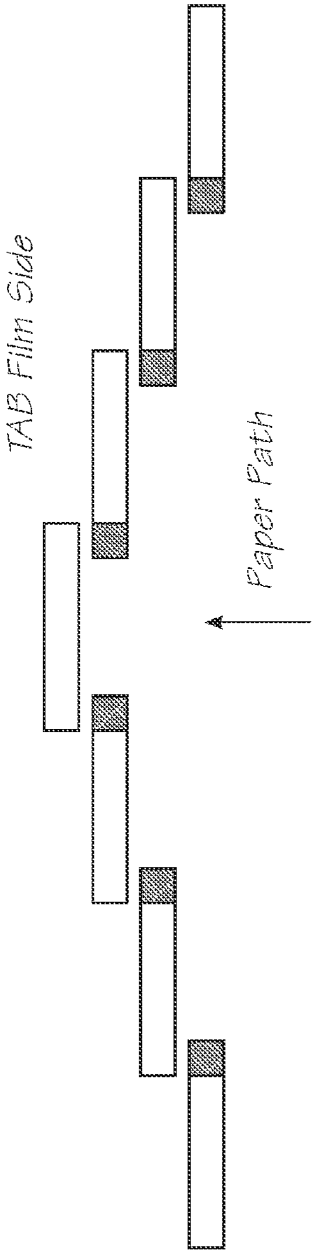
FIG. 5D schematically shows one more configuration of the printhead modules in an overlapping relationship in accordance with the present invention.

The arrangement shown in FIG. 5A offers the best configuration in terms of compact printhead design as well as overall printer design. The printhead chips (3) are inclined relative to the support beam or at least the line along which the modules (2) are mounted. This allows the printhead chips (3) to overlap with respect to the paper path while the TAB films (6) extend from the same side of each chip without being significantly narrowed. The support beam extends normal to the paper direction so that the printing occurs over a minimal length of the paper path so that the overall dimensions of the printer are reduced.

The present invention will now be described with particular reference to the Applicant's MEMJET™ technology, various aspects of which are described in detail in the cross referenced documents. It will be appreciated that MEMJET™ is only one embodiment of the invention and used here for the purposes of illustration only. It is not to be construed as restrictive or limiting in any way on the extent of the broad inventive concept.

A MEMJET™ printhead is composed of a number of identical printhead modules (2) described in greater detail below. Throughout the description and the cross references the array of ink ejecting nozzles on each module has been variously referred to as a 'printhead chip', 'chip' or 'segment'. However, from a fair reading of the whole specification in the context of the cross references, the skilled artisan will readily appreciate that these integers are essentially the same.

A MEMJET™ printhead is a drop-on-demand 1600 dpi inkjet printer that produces bi-level dots in up to 6 colors to produce a printed page of a particular width. Since the printhead prints dots at 1600 dpi, each dot is approximately 22.5 μm in diameter, and the dots are spaced 15.875 μm apart. Because the printing is bi-level, the input image is typically dithered or error-diffused for best results.

Figure 8:
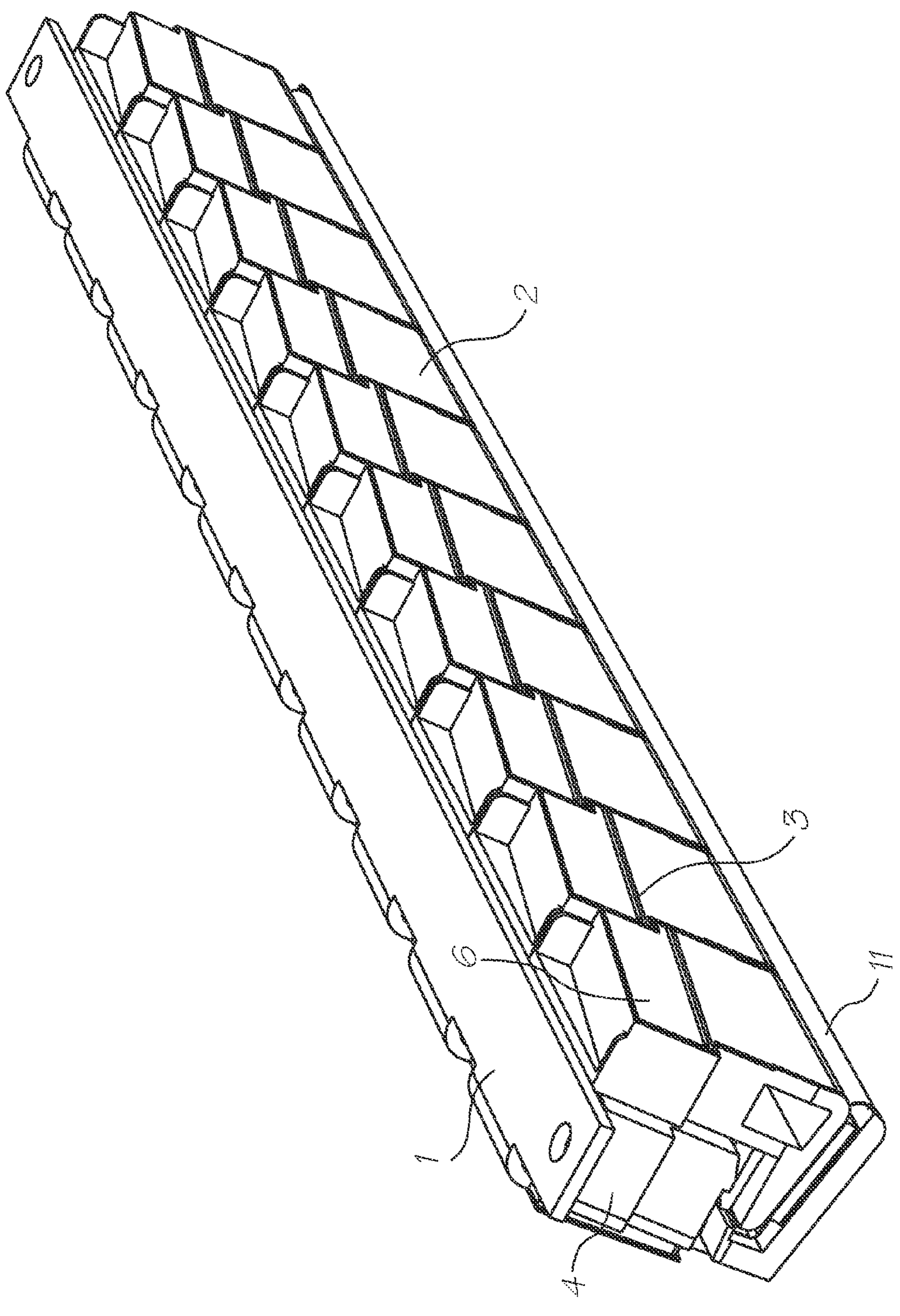
FIG. 8 is a perspective view showing the underside of a modular printhead according to the present invention.
Figure 9:
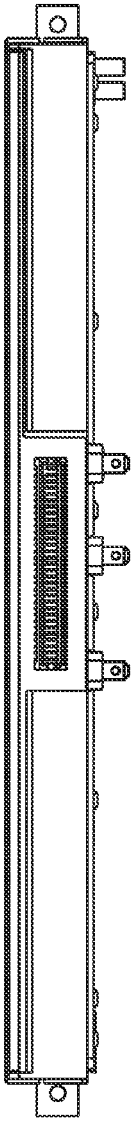
FIG. 9 shows a rear view of the modular printhead at FIG. 8.
Figure 10:
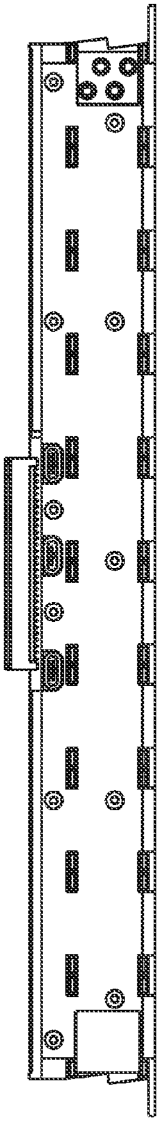
FIG. 10 is a plan view of the modular printhead shown in FIG. 8.

Typically a MEMJET™ printhead for a particular application is page-width. This enables the printhead to be stationary and allows the paper to move past the printhead. FIG. 8 illustrates a typical configuration. 21 mm printhead modules are placed together after manufacture to produce a printhead of the desired length (for example 15 modules can be combined to form a 12-inch printhead), with overlap as desired to allow for smooth transitions between modules. The modules are joined together by being placed on an angle such that the printhead chips (3) overlap each other, as shown in FIG. 5. The exact angle will depend on the width of the MEMJET™ module and the amount of overlap desired, but the vertical height is in the order of 1 mm, which equates to 64 dot lines at 1600 dpi.

Each chip has two rows of nozzles for each color, an odd row and an even row. If both rows of cyan nozzles were to fire simultaneously, the ink fired would end up on different physical lines of the paper: the odd dots would end up on one line, and the even dots would end up on another. Likewise, the dots printed by the magenta nozzles would end up on a completely different set of two dot lines. The physical distances between nozzles is therefore of critical importance in terms of ensuring that the combination of colored inks fired by the different nozzles ends up in the correct dot position on the page as the paper passes under the printhead.

The distance between two rows of the same color is 32 μm, or 2 dot rows. This means that odd and even dots of the same color are printed two dot rows apart. The distance between rows of one color and the next color is 128 μm, or 8 dot lines apart. If nozzles for one color's dot line are fired at time T, then nozzles for the corresponding dots in the next color must be fired at time T+8 dot-lines. We can generalize the relationships between corresponding nozzles from different rows by defining two variables:

$D_1$=distance between the same row of nozzles between two colors=8

$D_2$=distance between two rows of the same color in dot-lines=2

Both $D_1$ and $D_2$ will always be integral numbers of dot rows. We can now say that if the dot row of nozzles is row L, then row 1 of color C is dot-line:

$$L-(C-1)D_1$$

and row 2 of color C is dot-line:

$$L-(C-1)D_1-D_2$$

The relationship between color planes for a given odd/even dot position in Table 1. for an example 6-color printhead. Note that if one of the 6 colors is fixative it should be printed first.

TABLE 1

Relationship between different rows of nozzles

| Color | Sense | dot line | when $D_2 = 2, D_1 = 8$ |
|---|---|---|---|
| 0 (fixative) | even nozzle | L | L |
| | odd nozzle | L - $D_2$ | L - 2 |
| 1 (black) | even nozzle | L - $D_1$ | L - 8 |
| | odd nozzle | L - $D_1$ - $D_2$ | L - 10 |
| 2 (yellow) | even nozzle | L - $2D_1$ | L - 16 |
| | odd nozzle | L - $2D_1$ - $D_2$ | L - 18 |
| 3 (magenta) | even nozzle | L - $3D_1$ | L - 24 |
| | odd nozzle | L - $3D_1$ - $D_2$ | L - 26 |
| 4 (cyan) | even nozzle | L - $4D_1$ | L - 32 |
| | odd nozzle | L - $4D_1$ - $D_2$ | L - 34 |
| 5 (infrared) | even nozzle | L - $5D_1$ | L - 40 |
| | odd nozzle | L - $5D_1$ - $D_2$ | L - 42 |

Each of the colored inks used in a printhead has different characteristics in terms of viscosity, heat profile etc. Firing pulses are therefore generated independently for each color.

In addition, although coated paper may be used for printing, fixative is required for high speed printing applications on plain paper. When fixative is used it should be printed before any of the other inks are printed to that dot position. In most cases, the fixative plane represents an OR of the data for that dot position, although it does depend on the ink characteristics. Printing fixative first also preconditions the paper so that the subsequent drops will spread to the right size.

Figure 6:
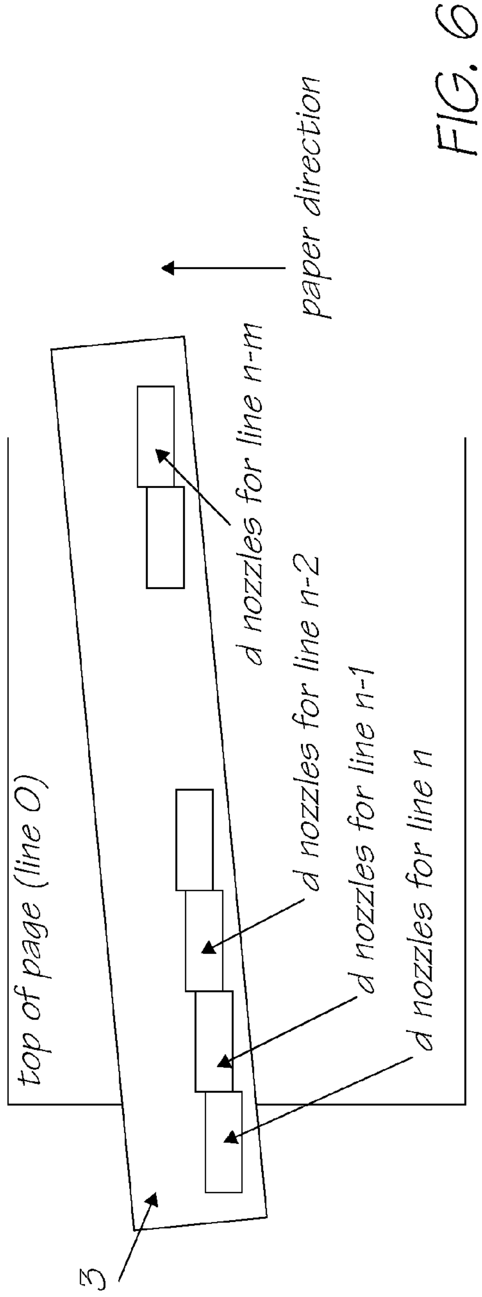
FIG. 6 schematically shows a single printhead chip in relation to the paper path.

FIG. 6 shows more detail of a single printhead chip (3) in the module array, considering only a single row of nozzles for a single color plane. Each of the printhead chips (3) can be configured to produce dots for multiple sets of lines. The leftmost d nozzles (d depends on the angle that the modules is placed at) produce dots for line n, the next d nozzles produce dots for line n−1, and so on.

If a printhead chip (3) consists of 640 nozzles in a single row of odd or even nozzles (totaling 1280 nozzles of a single color) and the angle of printhead chips (3) placement produces a height difference of 64 lines (as shown in FIG. 5), then d=10. This means that the module (2) prints 10 dots on each of 64 sets of lines. If the first dotline was line L, then the last dotline would be dotline L-63.

Figure 7:
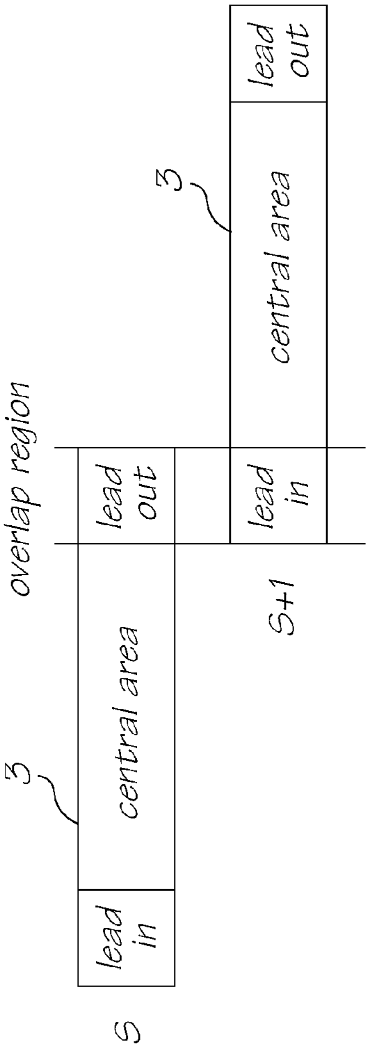
FIG. 7 schematically shows the overlap region between two adjacent modules.

As can be seen by the placement of adjacent modules (2) in FIG. 7, the corresponding row of nozzles in each modules produces dots for the same set of 64 lines, just horizontally shifted. The horizontal shift is an exact number of dots. Given S printhead chips (3), then a given print cycle produces dS dots on the same line. If S=15, then dS=150.

Figure 11:
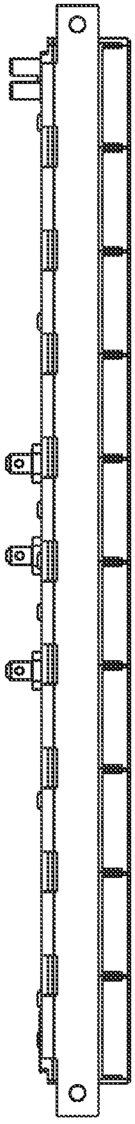
FIG. 11 is a front view of the modular printhead shown in FIG. 8.
Figure 12:
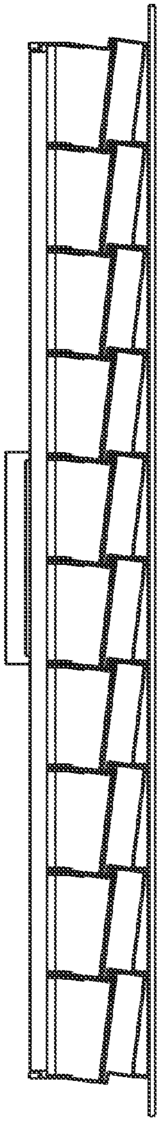
FIG. 12 is an underneath view of the modular printhead shown in FIG. 8.
Figure 13:
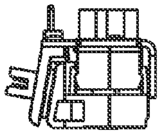
FIG. 13 is a left end view of the modular printhead shown in FIG. 8.
Figure 14:
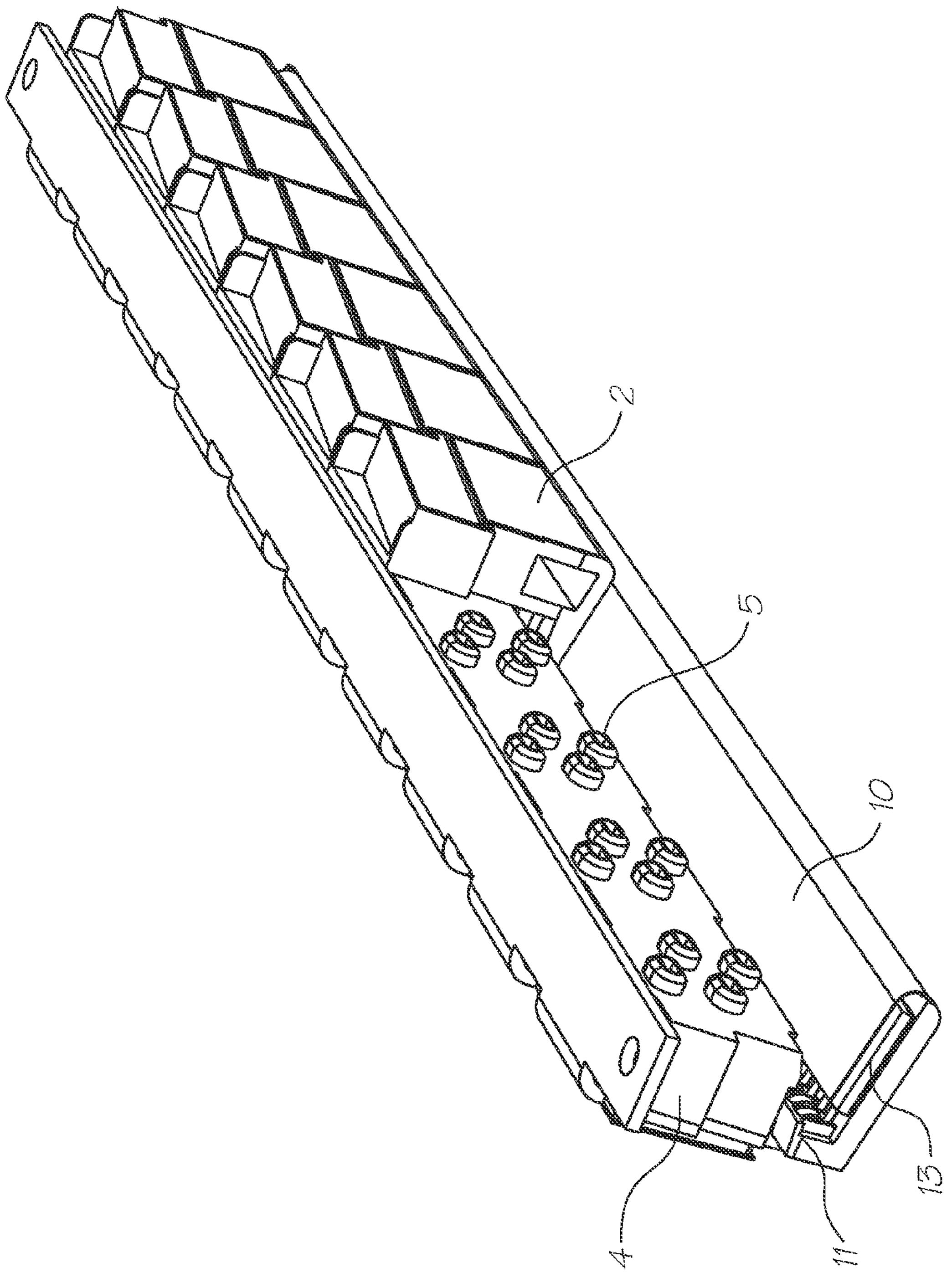
FIG. 14 is a perspective view of the underside of a modular printhead with several of the printhead modules removed.
Figure 15:
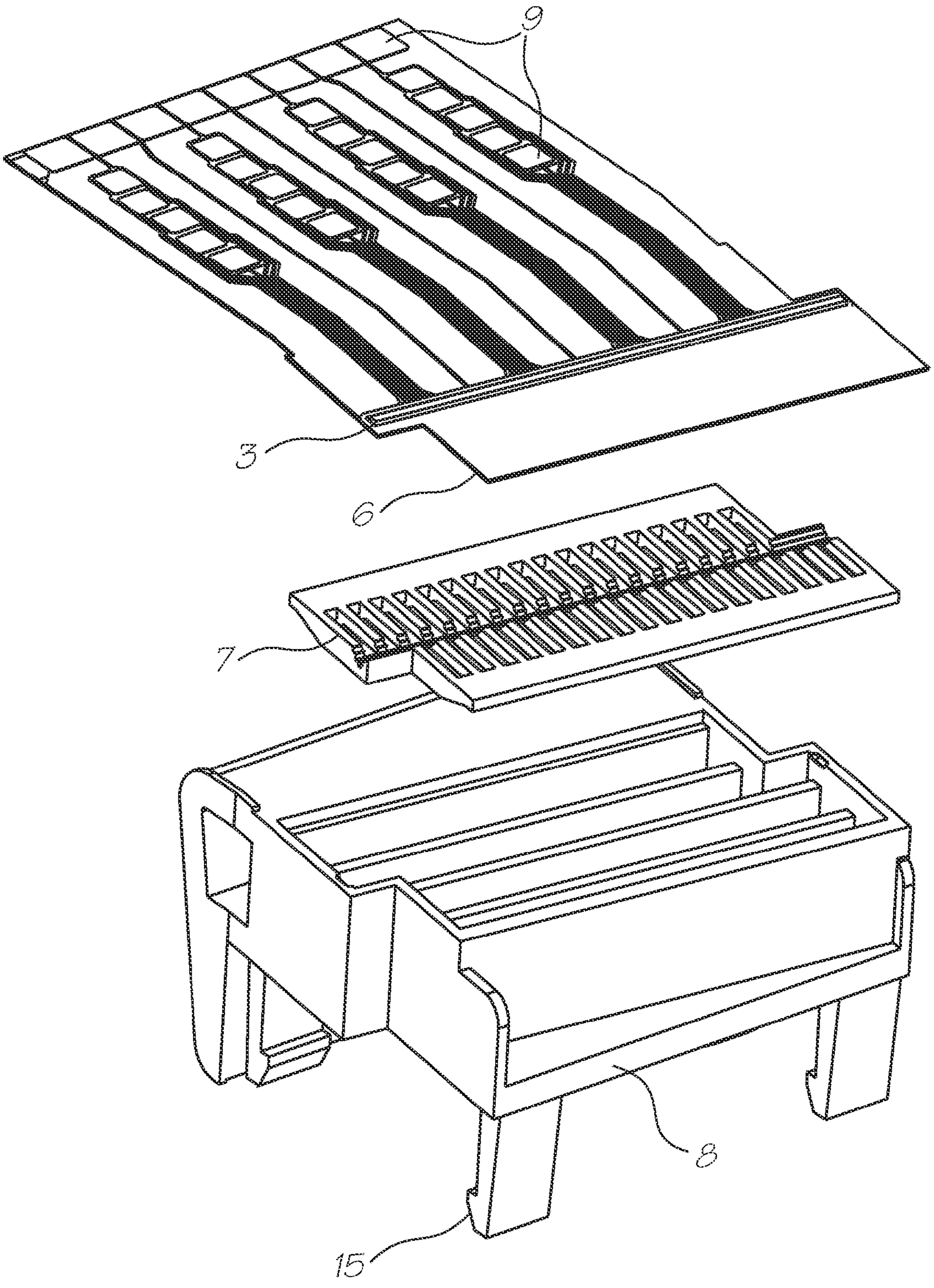
FIG. 15 shows an exploded perspective view of a printhead module.
Figure 16:
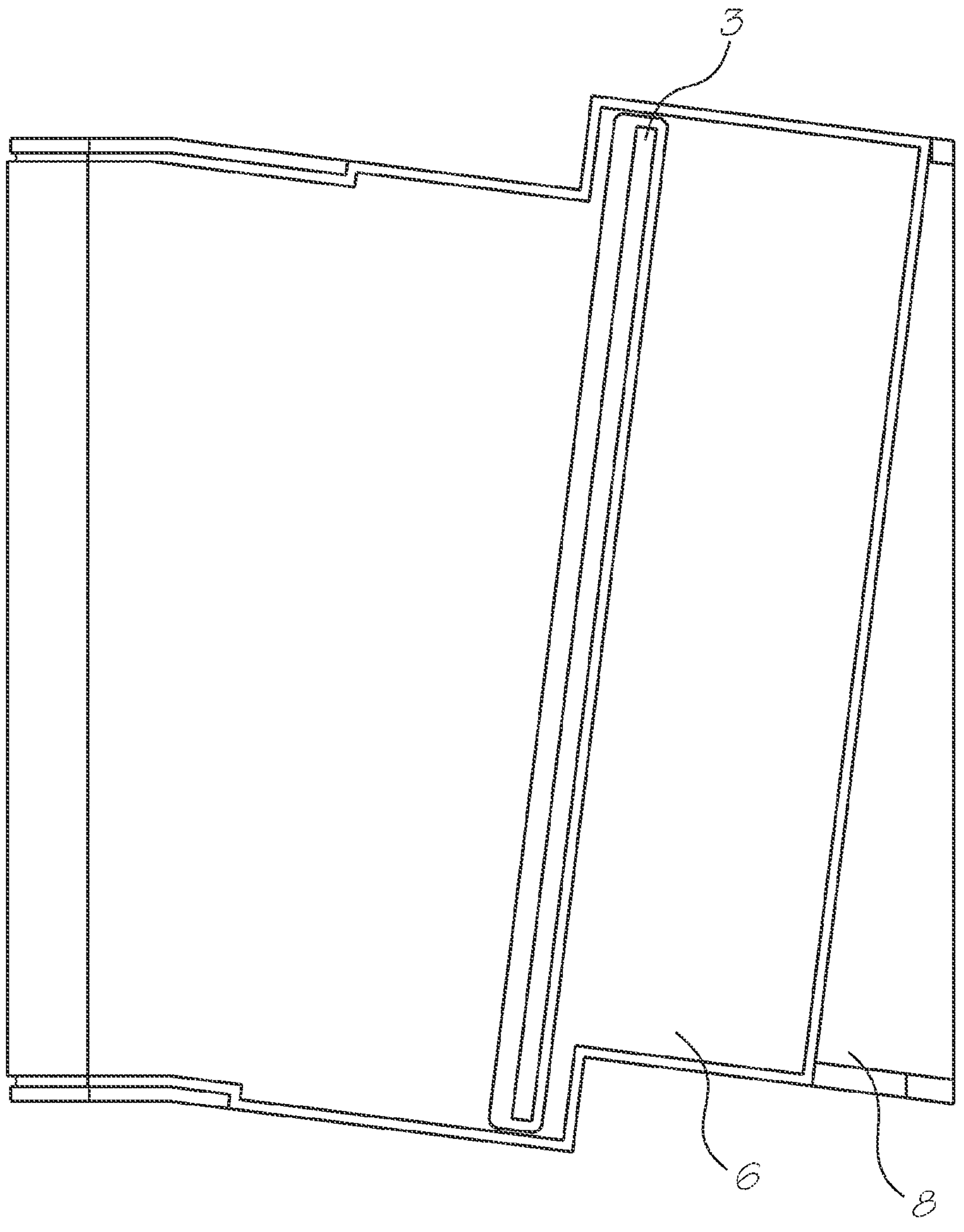
FIG. 16 shows an underside view of a printhead module.
Figure 17:
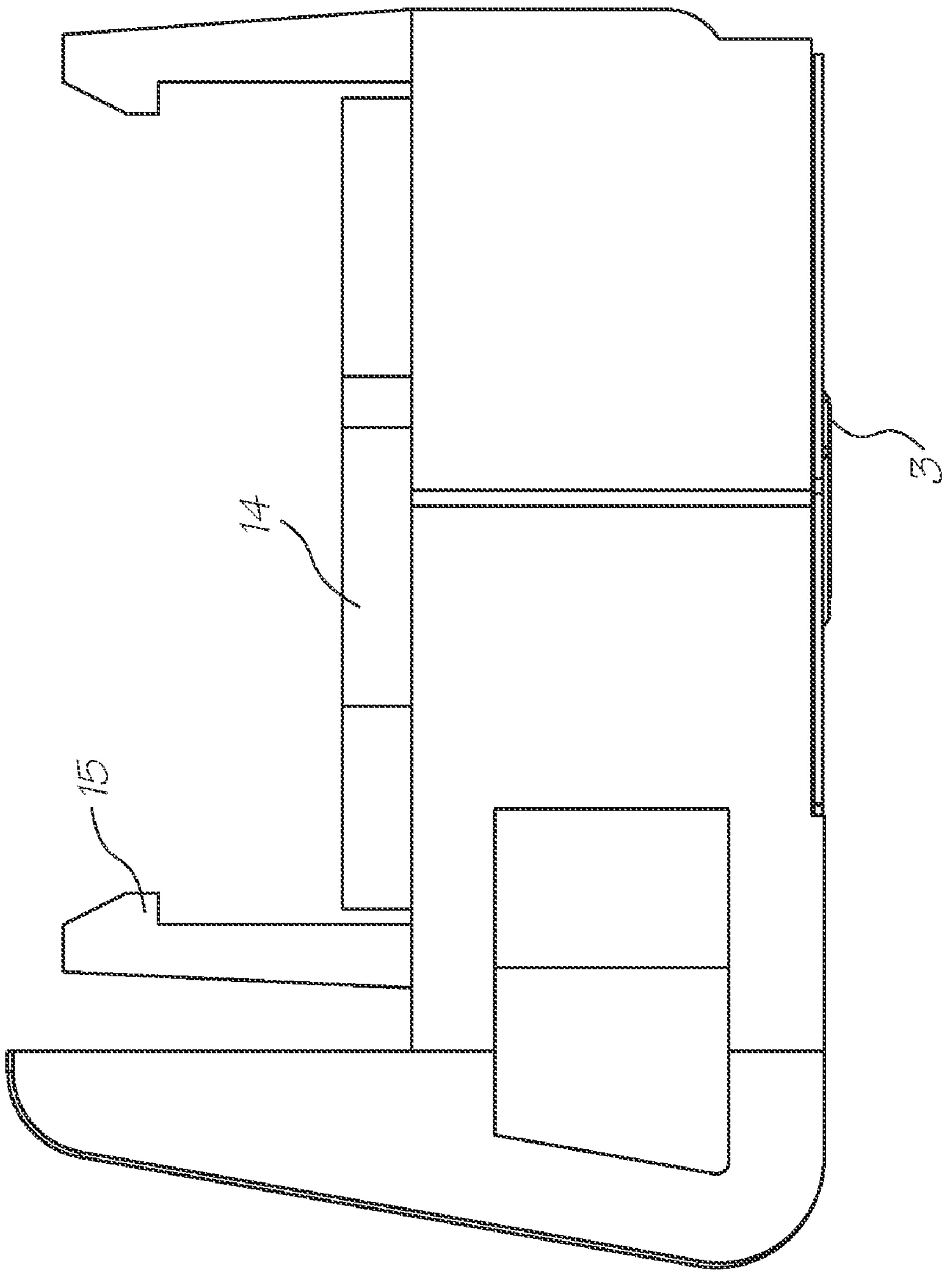
FIG. 17 shows an end view of a printhead module.
Figure 18:
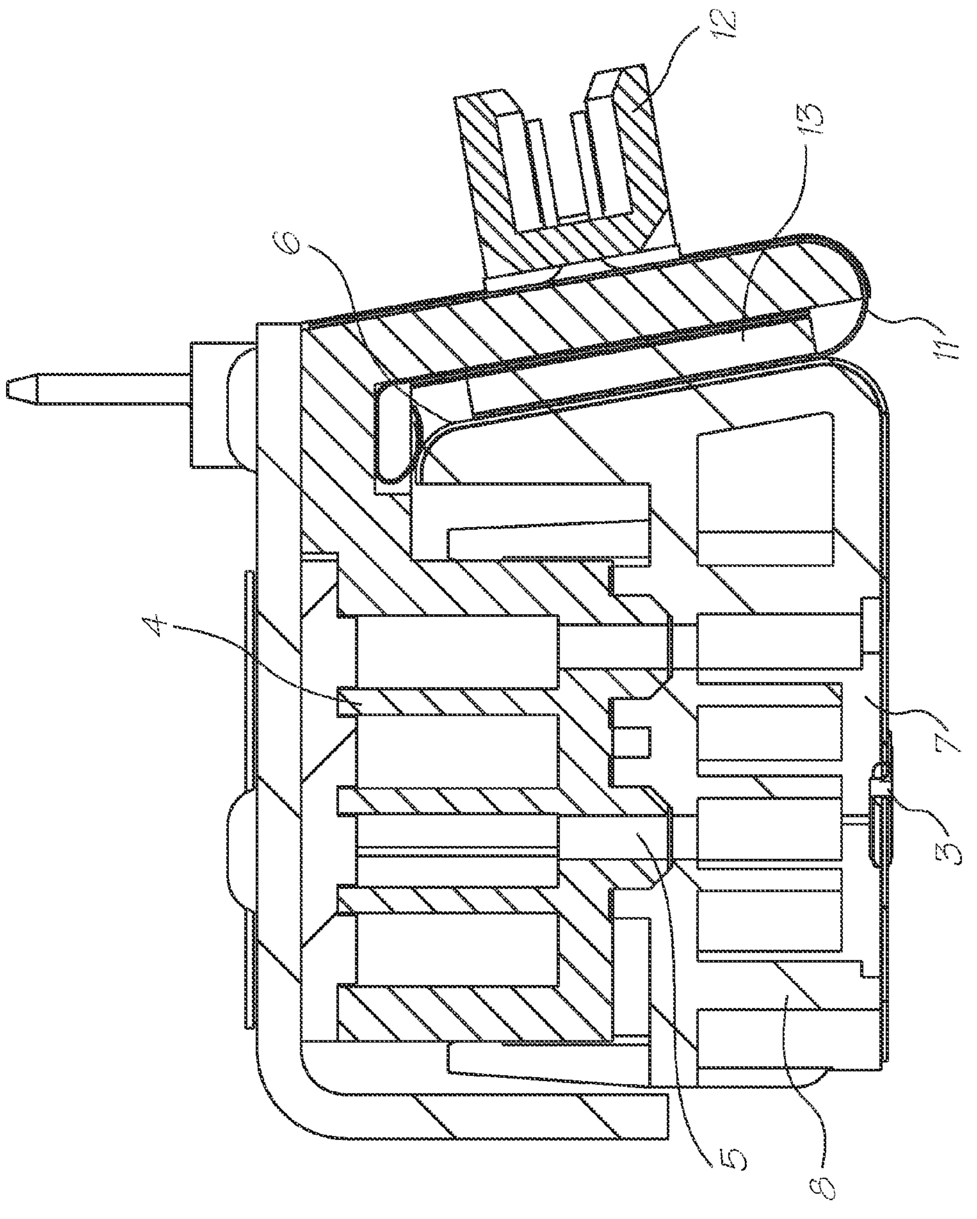
FIG. 18 shows a cross-sectional view of the modular printhead shown in FIG. 8.

Although each 21 mm printhead chip (3) prints 1600 dpi bi-level dots over a different part of page to produce the final image, there is some overlap between printhead chips (3), as shown in FIG. 11. Given a particular overlap distance, each printhead chips (3) can be considered to have a lead-in area, a central area, and a lead-out area. The lead-out of one chip (3) corresponds to the lead-in of the next. The central area of a chip (3) is that area that has no overlap at all. FIG. 11 illustrates the three areas of a chip (3) by showing two overlapping chips in terms of aligned print-lines. Note that the lead-out area of chip S corresponds to the lead-in area of chip S+1.

When producing data for the printhead, care must be taken when placing dot data into nozzles corresponding to the overlap region. If both nozzles fire the same data, then twice as much ink will be placed onto the pages in overlap areas. Instead, the dot data generator should start placing data into chip S at the start of the chip overlap region while removing the data from the corresponding nozzles in chip S+1, and ramp stochastically across the overlap area so that by the end of the overlap area, the data is all allocated to nozzles in chip S+1.

In addition, a number of considerations must be made when wiring up a printhead. As the width of the printhead increases, the number of modules (2) increases, and the number of connections also increases. Each chip (3) has its own Dn connections (C of them), as well as SrClk and other connections for loading and printing.

When the number of chips is small it is reasonable to load all the chips (3) simultaneously by using a common SrClk line and placing C bits of data on each of the Dn inputs for the chips. In a 4-chip 4 color printer, the total number of bits to transfer to the printhead in a single SrClk pulse is 16. However for a Netpage (see cross references) enabled (C=6) 12-inch printer, S=15, and it is unreasonable to have 90 data lines running from the print data generator to the printhead.

Instead, it is convenient to group a number of chip (3) together for loading purposes. Each group of chips (3) is small enough to be loaded simultaneously, and share a SrClk. For example, a 12-inch printhead can have 2 chip groups, each chip group containing 8 chips (3). 48 Dn lines can be shared for both groups, with 2 SrClk lines, one per chip group.

As the number of chip groups increases, the time taken to load the printhead increases. When there is only one group, 1280 load pulses are required (each pulse transfers C data bits). When there are G groups, 1280G load pulses are required. The connection between the data generator and the printhead is at most 80 MHz.

If G is the number of chip groups, and L is the largest number of chips in a group, the printhead requires LC Dn lines and G SrClk lines. Regardless of G, only a single LSyncL line is required—it can be shared across all chips.

Since L chips in each chip group are loaded with a single SrClk pulse, any printing process must produce the data in the correct sequence for the printhead. As an example, when G=2 and L=4, the first SrClk0 pulse will transfer the Dn bits for the next print cycle's dot 0, 1280, 2560 and 3840. The first SrClk1 pulse will transfer the Dn bits for the next print cycle's dot 5120, 6400, 7680, and 8960. The second SrClk0 pulse will transfer the Dn bits for the next print cycle's dot 1, 1281, 2561, and 3841. The second SrClk1 pulse will transfer the Dn bits for the next print cycle's dot 5121, 6401, 7681 and 8961.

After 1280G SrClk pulses (1280 to each of SrClk0 and SrClk1), the entire line has been loaded into the printhead, and the common LSyncL pulse can be given at the appropriate time.

As described above, the nozzles for a given chip (3) do not all print out on the same line. Within each color there are d nozzles on a given line, with the odd and even nozzles of the group separated by $D_2$ dot-lines. There are $D_1$ lines between corresponding nozzles of different colors ($D_1$ and $D_2$ parameters are further described in Section and Section). The line differences must be taken into account when loading data into the printhead. Considering only a single chip group, Table 2. shows the dots transferred to chip n of a printhead during the a number of pulses of the shared SrClk.

TABLE 2

Order of dots transferred to chip S in a modular printhead

| pulse | Dot | color0 line | color1 line | colorC line |
|---|---|---|---|---|
| 0 | 1280S[1] | N | $N\text{-}D_1$[2] | $N\text{-}CD_1$ |
| 1 | 1280S + 1 | $N\text{-}D_2$[3] | $N\text{-}D_1\text{-}D_2$ | $N\text{-}CD_1\text{-}D_2$ |
| 2 | 1280S + 2 | N | $N\text{-}D_1$ | $N\text{-}CD_1$ |
| 3 | 1280S + 3 | $N\text{-}D_2$ | $N\text{-}D_1\text{-}D_2$ | $N\text{-}CD_1\text{-}D_2$ |
| 2d[4] | 1280S + 2d | N-1 | $N\text{-}D_1\text{-}1$ | $N\text{-}CD_1\text{-}1$ |
| 2d + 1 | 1280S + 2d+ | $N\text{-}D_2\text{-}1$ | $N\text{-}D_1\text{-}D_2\text{-}1$ | $N\text{-}CD_1\text{-}D_2\text{-}1$ |

[1]S = chip number
[2]$D_1$ = number of lines between the nozzles of one color and the next (likely = 7-10)
[3]$D_2$ = number of lines between two rows of nozzles of the same color (likely = 2)
[4]d = number of nozzles printed on the same line by a given chip And so on for all 1280 SrClk pulses to the particular chip group.

With regards to printing, we print 10 C nozzles from each chip in the lowest speed printing mode, and 80 C nozzles from each chip in the highest speed printing mode.

While it is certainly possible to wire up chips in any way, this document only considers the situation where all chips fire simultaneously. This is because the low-speed printing mode allows low-power printing for small printheads (e.g. 2-inch and 4-inch), and the controller chip design assumes there is sufficient power available for the large print sizes (such as 8-18 inches). It is a simple matter to alter the connections in the printhead to allow grouping of firing should a particular application require it.

When all chips are fired at the same time 10 CS nozzles are fired in the low-speed printing
mode and 80 CS nozzles are fired in the high-speed printing mode.

A chip produces an analog line of feedback used to adjust the profile of the firing pulses. Since multiple chips are collected together into a printhead, it is effective to share the feedback lines as a tri-state bus, with only one of the chips placing the feedback information on the feedback lines at a time.

The printhead is constructed from a number of chips as described in the previous sections. It assumes that for data loading purposes, the chips have been grouped into G chip groups, with L chips in the largest chip group. It assumes there are C colors in the printhead. It assumes that the firing mechanism for the printhead is that all chips fire simultaneously, and only one chip at a time places feedback information on a common tri-state bus. Assuming all these things, Table 3 lists the external connections that are available from a printhead:

TABLE 3

Printhead connections

| name | #pins | description |
|---|---|---|
| Dn | CL | Inputs to C shift registers of chips 0 to L-1 |
| SrClk | G | A pulse on SrClk[N] (ShiftRegisterClock N) loads the current values from Dn lines into the L chips in chip group N. |
| LSyncL | 1 | A pulse on LSyncL performs the parallel transfer from the shift registers to the internal NozzleEnable bits and starts the printing of a line for all chips. |
| hclk | 1 | Phase Locked Loop clock for generation of timing signals in printhead |
| Reset | 1 | Control reset |
| SCL | 1 | serial clock for control |
| SDA | 1 | serial data for control |
| Sense | 1 | Analog sense output |
| Gnd | 1 | Analog sense ground |
| V− | Many, depending on the number of colors | Negative actuator supply |
| V+ | | Positive actuator supply |
| $V_{ss}$ | | Negative logic supply |
| $V_{dd}$ | | Positive logic supply |

Referring to FIGS. 8 to 18, the modular printhead has a metal chassis (1) which is fixedly mounted within a digital inkjet printer (not shown). Snap-locked to the metal chassis (1) are a plurality of replaceable printhead modules (2). The modules (2) are sealed units with four separate ink channels that feed a printhead chip (3). As best seen in FIG. 7, each printhead module (2) is plugged into a reservoir molding (4) that supplies ink to the integrally molded funnels (5).

The ink reservoir (4) may itself be a modular component so the entire modular printhead is not necessarily limited to the width of a page but may extend to any arbitrarily chosen width.

Referring to FIGS. 15 to 18, the printhead modules (2) each comprise a printhead chip (3) bonded to a TAB film (6) accommodated and supported by a micro molding (7). This is, in turn, adapted to mate with a cover molding (8). The printhead chip (3) is a MEMS (micro electro mechanical System) device. Typically, MEMJET™ chips print cyan, magenta, yellow and black (CMYK) ink. This provides color printing at an image resolution of 1600 dots per inch (DPI) which is the accepted standard for photographic image quality.

If there is a defect in the chip it usually appears as a line or void in the printing. If the printhead were to be formed from a single chip then the entire printhead would need replacement. By modularizing the printheads there is less probability that any particular printhead module will be defective. It will be appreciated that the replacement of single printhead modules and the greater utilization of silicon wafers provide a significant saving in production and operating costs.

The TAB film (6) has a slot to accommodate the MEMJET™ chip (3) and gold plated contact pads (9) that connect with the flex PCB (flexible printed circuit board) (10) and busbar (11) to get data and power respectively to the printhead. The busbars (11) are thin fingers of metal strip separated by an insulating strip. The busbar sub-assembly (11) is mounted on the underside of the side wall ink reservoir (4).

The flex PCB (10) is mounted to the angled side wall of the reservoir (4). It wraps beneath the side wall of the reservoir (4) and up the external surface carrying data to the MEMJET™ modules (2) via a 62 pin header (12). Side wall of the ink reservoir (4) is angled to correspond with the side of the cover molding (8) so that when the printhead module (2) is snap-locked in place, the contacts (9) wipe against the corresponding contacts on the flex PCB to promote a reliable electrical connection. The angle also assists the easy removal of the modules (2). The flex PCB (11) is "sprung" by the action of a foam backing (13) mounted between the wall and the underside of the contact area.

Rib details on the underside of the micro molding (7) provide support for the TAB film (6) when they are bonded together. The TAB film (6) forms the underside wall of the printhead module (2) as there is enough structural integrity between the pitch of the ribs to support a flexible film. The edges of the TAB film (6) are sealed on the underside of the walls of the cover molding (8). The chip (3) is bonded onto 100 micron wide ribs that run the length of the micro molding (7) providing the final ink feed into the MEMJET™ print nozzles.

The design of the micro molding (7) allows for a physical overlap of the MEMJET™ chips (3) when the modules (2) are mounted adjacent one another. Because the printhead modules (2) form a continuous strip with a generous tolerance, they can be electronically adjusted to produce a continuous print pattern, rather than relying on very close tolerance moldings and exotic materials to perform the same function. According to this embodiment, the printing chips (3) are 21 mm long but are angled such that they provide a printing width of 20.33 mm.

The micro molding (7) fits inside the cover molding (8) where it bonds onto a set of vertically extending ribs. The cover molding (8) is a two shot precision injection molding that combines an injected hard plastic body with soft elastomeric sealing collars at the inlet to each ink chamber defined within the module.

Four snap-lock barbs (15) mate with the outer surface of the ink reservoir (4) which acts as an extension of metal chassis (1). The ink funnels (5) sealingly engage with the elastomeric collars (14).

The modular design conveniently allows the MEMJET™ printhead modules (2) to be removably snap-locked onto the ink reservoir (4). Accurate alignment of the MEMJET™ chip (3) with respect to the metal chassis is not necessary as a complete modular printhead will undergo digital adjustment of each chip (3) during final quality assurance testing.

The TAB film (6) for each module (2) interfaces with the flex PCB (11) and the busbars (11) as it is clipped onto the ink reservoir (4). To disengage a MEMJET™ printhead module (2) the snap-lock barbs (15) may be configured for release upon the application of sufficient force by the user. Alternatively, the snap-lock barbs (15) can be configured for a more positive engagement with the ink reservoir (4) such that a customized tool (not shown) is required for disengagement of the module.

The invention has been described herein by way of example only and skilled workers in this field will readily recognize many variations and modifications which do not depart from the spirit and scope of the broad inventive concept.

The invention claimed is:

1. A printer including:

a plurality of printhead modules located across a print media transport path, each printhead module having an elongate printhead, nozzles of respective printheads overlap with nozzles of printheads of neighboring printhead modules; and a dot data generator for providing print data to the nozzles such that print data is stochastically ramped from one neighbouring printhead module to a next neighbouring printhead module in an overlap region.

2. A printer according to claim 1, wherein the printheads are slanted.

3. A printer according to claim 2, wherein the printhead modules are all slanted in the same direction.

4. A printer according to claim 1, wherein respective printhead modules are in fluid communication with corresponding ink supply ports of one or more ink reservoirs, the ink supply ports including ink supply conduits surrounded by protrusions.

5. A printer according to claim 4, wherein the protrusions are engaged by elastomeric collars formed in the printhead modules.

6. A printer according to claim 1, wherein the printhead modules are identical.

* * * * *